UNITED STATES PATENT OFFICE.

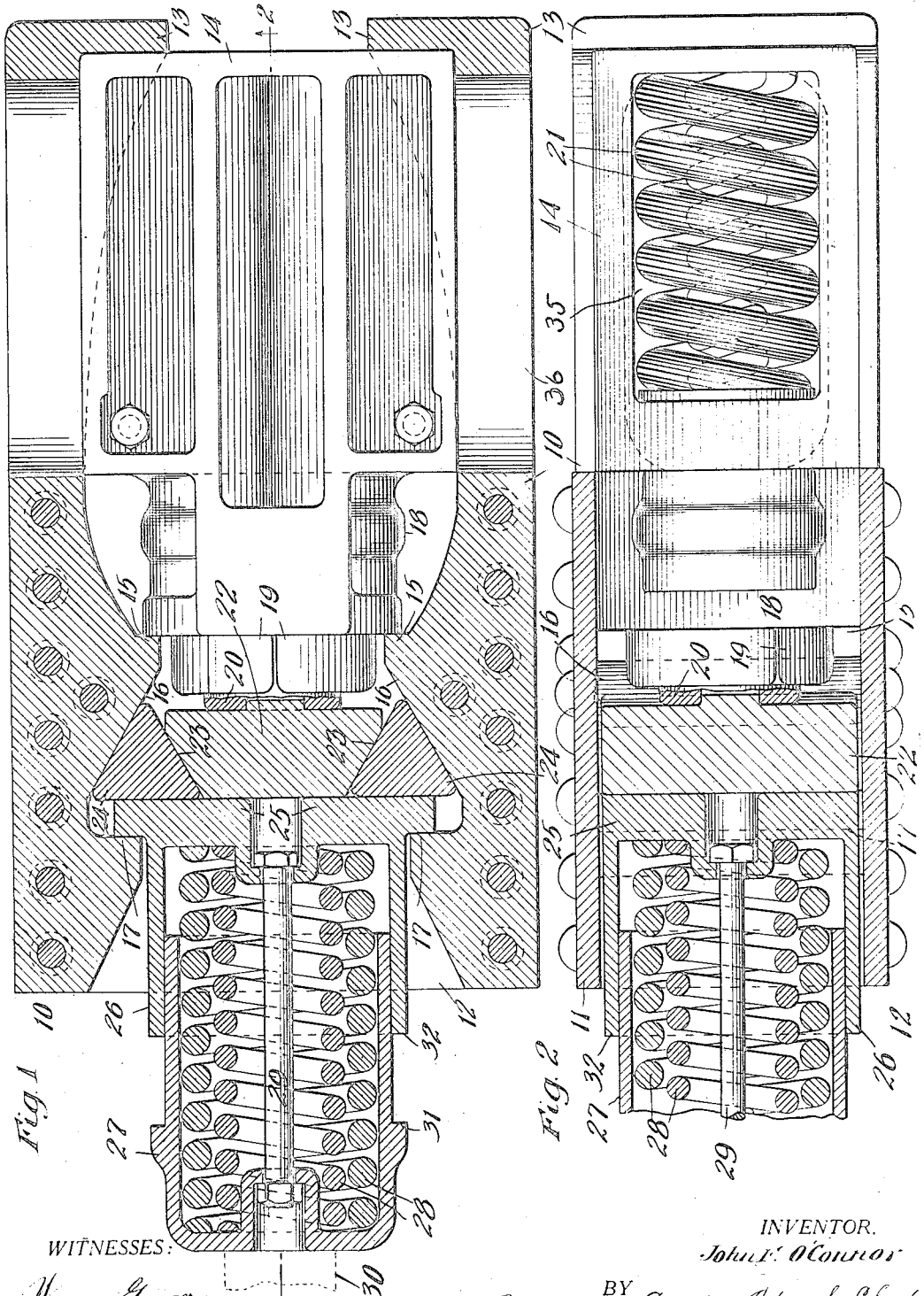

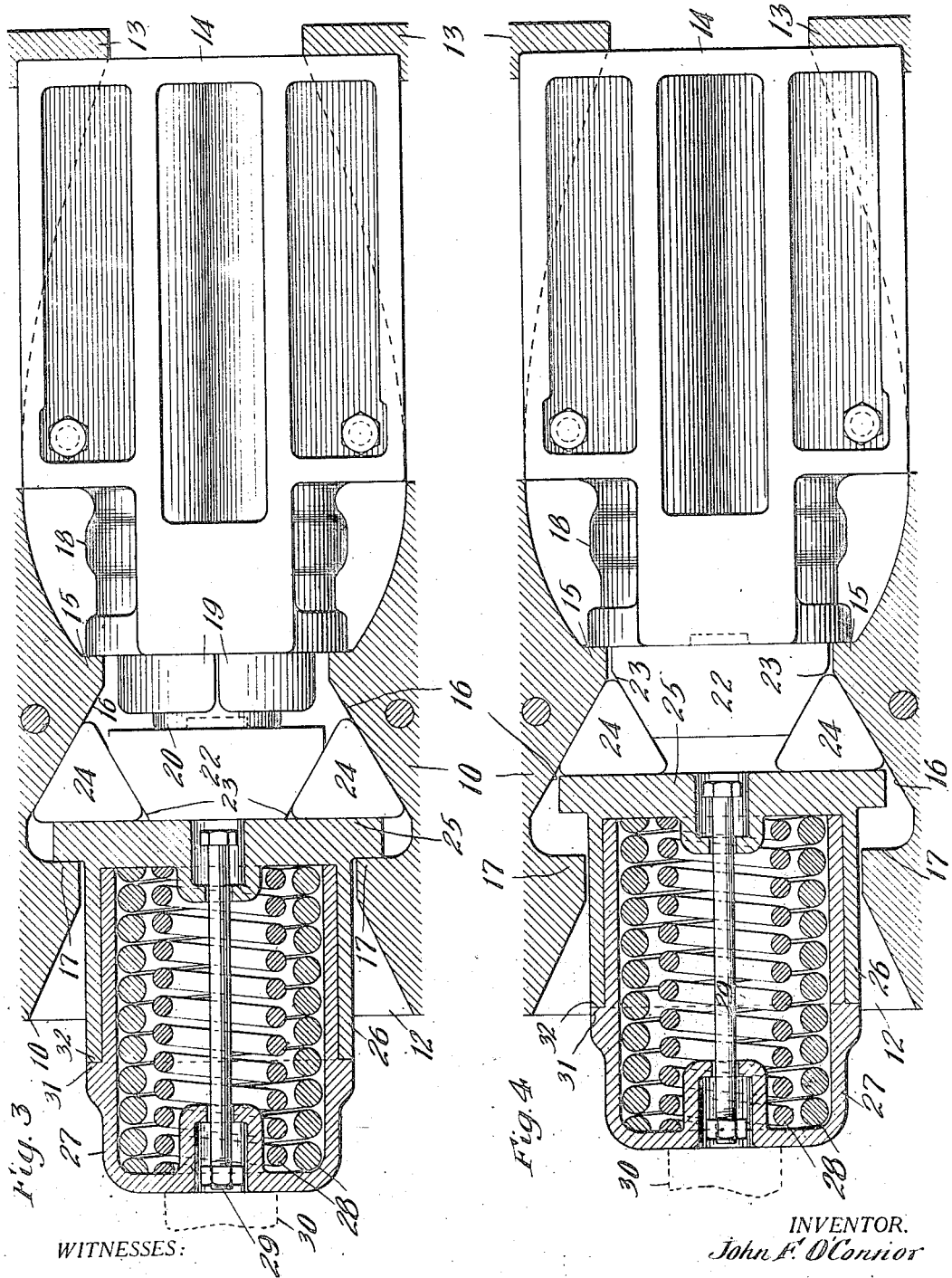

JOHN F. O'CONNOR, OF CHICAGO, ILLINOIS, ASSIGNOR TO WILLIAM H. MINER, OF CHICAGO, ILLINOIS.

CAR-BUFFING MECHANISM.

1,148,186.　　　Specification of Letters Patent.　　Patented July 27, 1915.

Application filed February 28, 1914.　Serial No. 821,668.

*To all whom it may concern:*

Be it known that I, JOHN F. O'CONNOR, a citizen of the United States, residing in Chicago, in the county of Cook and State of Illinois, have invented a new and useful Improvement in Car-Buffing Mechanism, of which the following is a specification.

This invention relates to improvements in car buffing mechanism.

The object of the invention is to provide a car buffing mechanism of high capacity and having both a preliminary spring action and a combined spring and friction final action.

The invention furthermore consists in the improvements in the parts and devices and in the novel combination of the parts and devices herein shown, described or claimed.

In the drawing forming a part of this specification, Figure 1 is a horizontal, sectional view showing one form of mechanism embodying my improvements, the friction shell being shown in plan. Fig. 2 is a vertical section taken substantially on the line 2—2 of Fig. 1. Fig. 3 is a view similar to Fig. 1 but showing the preliminary springs fully compressed at the end of the preliminary action of the mechanism, and Fig. 4 is a view similar to Fig. 3 but showing the final position of the parts.

In said drawing, the buffer mechanism is shown as comprising castings 10, 10 united by horizontal upper and lower plates 11 and 12. Each of the castings 10 is provided with a rear stop 13 against which the rear end of the combined friction shell and spring casing 14 abuts and is prevented from rearward movement, forward movement of said shell being prevented by shoulders 15 also formed integral with said castings. As clearly appears from Figs. 1 and 2, the castings 10 are each provided with an elongated opening 35 on the side thereof and the casing 14 is also provided with openings 36 on its sides whereby the assembling or disassembling of the parts, particularly the springs, is facilitated. Forward of the shoulders 15, the castings are provided with inwardly inclined friction surfaces 16 and front stops 17. The combined friction shell and spring casing 14 has a cylindrical friction shell portion 18 at its forward end within which are mounted a plurality of circularly arranged friction shoes 19 with which coöperates a wedge or spreader 20, movement of the friction shoes and wedge being resisted by parallelly arranged springs 21, (see Fig. 2). Seated against the wedge 20 is another wedge 22 having inclined end faces 23 with which coöperate triangularly shaped wedges 24, each of which has faces in engagement with the friction surfaces 16, the ends of the wedge 22 and the rear face of a follower 25 formed integral with a spring casing 26, the latter being telescoped with another spring casing 27. The casings 26 and 27 have mounted therewith a pair of nested springs 28 and are prevented from separation by a bolt 29 arranged as shown. The spring casings 26 and 27 are normally separated to the extent indicated in Fig. 1, but when the casing 27 is moved inwardly by the buffer stem indicated in dotted lines at 30, the nested springs 28 are compressed until the shoulder 31 on the casing 27 engages the end or shoulder 32 on the casing 26, as shown in Figs. 3 and 4, thus preventing over-compression or setting of the preliminary compression springs. After the casings 26 and 27 are telescoped to the extent shown in Fig. 3, the follower 25 then moves the triangular-shaped wedges 24 rearwardly and the latter will at the same time be moved inwardly as they slide along the inclined friction surfaces 16. The combined longitudinal and lateral movement of the wedges 24 causes the wedge 22 to move longitudinally parallel with the center line of the buffing mechanism, thus forcing the wedge or spreader inwardly and bringing the friction shoes and friction shell into operation. On account of the arrangement of wedges 24 and 22 being as shown, the wedge 22 will be moved substantially twice as much as the follower 25 is moved, thus multiplying the effective resistance of the friction shock absorbing devices.

From the preceding description it will be seen that the buffing mechanism which I have provided is of extremely high capacity yet the same gives a preliminary light spring action and a final multiplied frictional action.

Although I have herein shown and described what I now consider the preferred embodiment of my improvements, yet it will be understood that various changes and modifications may be made without departing from the spirit of the invention, and all such changes and modifications are contemplated as come within the scope of the claims appended hereto.

I claim:—

1. A car buffing mechanism including, in combination: side castings having rear stops, front stops and inclined friction walls intermediate said stops; a combined friction shell and spring casing having its rear end abutting said rear stops; friction shoes and a spreader therefor coöperable with the friction shell; telescoped casings, one of which is provided with a follower normally engaging said front stops; a preliminary compression spring mounted within said casings; and a plurality of wedges interposed between said follower and the wedge of the friction device, some of said wedges engaging said inclined surfaces of the side castings, substantially as specified.

2. A car buffing mechanism including, in combination: side castings having rear and front stops for a friction shell and casing, said castings having also inclined friction surfaces in front of said front stops; a combined friction shell and spring casing separate from, and rigidly mounted between, the side castings and engaging said stops at its rear and front ends; a friction device and springs within said shell and casing; a preliminary compression spring; and wedges interposed between said preliminary spring and said friction device, some of said wedges slidably and frictionally engaging said inclined friction surfaces, substantially as specified.

3. A car buffing mechanism including, in combination: a pair of side castings rigidly united by horizontal upper and lower plates and having front and rear stops therein, said side castings having also openings in the sides thereof near the rear end; a combined friction shell and spring casing mounted within said castings and engaging said stops, said casing being open on the sides opposite said openings in the side castings; friction devices mounted within said shell; springs within said casing; and means for operating said friction devices, substantially as specified.

Signed at Chicago, Illinois, this 26th day of February, 1914, in the presence of two subscribing witnesses.

JOHN F. O'CONNOR.

Witnesses:
WILLIAM A. GEIGER,
JOSEPH HARRIS.